(12) United States Patent
Havi et al.

(10) Patent No.: US 10,207,937 B2
(45) Date of Patent: *Feb. 19, 2019

(54) MODULAR WATER PROVISION METHOD FOR RURAL HOUSING

(71) Applicant: Mikhol Sahar Ltd., Jerusalem (IL)

(72) Inventors: Moshe Havi, Jerusalem (IL); Shalom Shay Hawai, Jerusalem (IL)

(73) Assignee: Mikhol Sahar Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,685

(22) Filed: Dec. 21, 2017

(65) Prior Publication Data

US 2018/0111851 A1 Apr. 26, 2018

Related U.S. Application Data

(63) Continuation-in-part of application No. 15/588,736, filed on May 8, 2017, now Pat. No. 9,890,056.

(60) Provisional application No. 62/334,467, filed on May 11, 2016.

(51) Int. Cl.
| | |
|---|---|
| *C02F 1/32* | (2006.01) |
| *C02F 1/00* | (2006.01) |
| *H01M 10/46* | (2006.01) |
| *E03B 3/00* | (2006.01) |
| *H02J 9/00* | (2006.01) |
| *H02J 7/00* | (2006.01) |
| *H02J 7/35* | (2006.01) |

(52) U.S. Cl.
CPC .............. *C02F 1/325* (2013.01); *C02F 1/004* (2013.01); *E03B 3/00* (2013.01); *H01M 10/465* (2013.01); *H02J 7/0013* (2013.01); *H02J 7/35* (2013.01); *H02J 9/00* (2013.01); *C02F 2201/008* (2013.01); *H01M 2220/10* (2013.01)

(58) Field of Classification Search
None
See application file for complete search history.

(56) References Cited

U.S. PATENT DOCUMENTS 9,890,056 B2 * 2/2018 Havi .................... C02F 1/004

* cited by examiner

*Primary Examiner* — Chester T Barry
(74) *Attorney, Agent, or Firm* — Eva Taksel

(57) ABSTRACT

The present invention provides a method for locally delivery of hundreds of liters of water to at least one household, the method including transporting a trailer carrier by a private car or vehicle to the at least one household, the trailer carrier housing a filling apparatus, a water filter apparatus, a delivery apparatus, a water container in fluid connection with the filling apparatus and with the delivery apparatus, a portable electricity generator, an un-interruptible power supply, an inverter, a battery pack and a solar panel, providing continuous current to the inverter for continuous function of the filling apparatus and delivering the hundreds of liters of water from the water container to the at least one household.

18 Claims, 16 Drawing Sheets

MODULAR WATER PROVISION METHOD FOR RURAL HOUSING

CROSS REFERENCE TO RELATED APPLICATIONS

This application is a continuation-in-part of application Ser. No. 15/588,736, filed on May 8, 2017, now U.S. Pat. No. 9,890,056.

FIELD OF THE INVENTION

The present invention relates generally to water transportation methods, and more specifically to methods for provision of potable water to populations housed in rural settings.

BACKGROUND OF THE INVENTION

Many developing countries suffer from dry seasons and/or poor water provision systems for housing. In many countries, the populations still rely upon people carrying water to their houses/tents. Often, there is no infrastructure of pipes and mains water supply. The local inhabitants may obtain water from a local river, pond or reservoir, by use of buckets, barrels and other water containers. These people can only carry a certain amount of water to their houses/tents. This limits their ability to wash themselves and their clothes, and further limits the hygienic use of food and beverages. There thus remains an unmet need to provide each family with hundreds of liters of water on a daily basis. Additionally, there is an unmet need for systems which can maneuver dirt tracked and untarmacked road to reach the residences of the local populations.

SUMMARY OF THE INVENTION

It is an object of some aspects of the present invention to provide an apparatus for provision of potable water to populations housed in rural settings In some embodiments of the present invention, improved methods and systems are provided for mobilization of an apparatus for provision of potable water to populations, typically housed in rural settings.

The present invention provides a method for locally delivery of hundreds of liters of water to at least one household, the method including transporting a trailer carrier by a private car or vehicle to the at least one household, the trailer carrier housing a filling apparatus, a water filter apparatus, a delivery apparatus, a water container in fluid connection with the filling apparatus and with the delivery apparatus, a portable electricity generator, an un-interruptible power supply, an inverter, a battery pack and a solar panel, providing continuous current to the inverter for continuous function of the filling apparatus and delivering the hundreds of liters of water from the water container to the at least one household.

There is thus provided according to an embodiment of the present invention, a method for locally delivery of hundreds of liters of water to at least one household, the method including;

a) transporting a trailer carrier by a private car or vehicle to the at least one household where road infrastructure is lacking, the trailer carrier being less than 1.4 meters wide, the trailer carrier housing;
 i. a filling apparatus including a filling conduit and a filling pump;
 ii. a water filter apparatus including a micronic and carbon filter system, coupled to an ultraviolet (UV) delivery purifier;
 iii. a delivery apparatus including a delivery conduit and a delivery pump;
 iv. a water container in fluid connection with the filling apparatus and with the delivery apparatus;
 v. a portable electricity generator an un-interruptible power supply (UPS) and an inverter;
 vi. a battery pack; and
 vii. a solar panel;

b) providing continuous current to the inverter for continuous function of the filling pump and the delivery pump; and c) delivering the hundreds of liters of water from the water container on the trailer carrier to the household.

Additionally, according to an embodiment of the present invention, the delivering step includes;
 i. fluidly connecting the water filter apparatus to the water container; and
 ii. fluidly connecting the to the delivery conduit to the water container; and
 iii. electrically activating the delivery pump.

Furthermore, according to an embodiment of the present invention, the delivering step provides provide filtered water to the at least one household via the delivery apparatus.

Further, according to an embodiment of the present invention, the electrically activating step includes providing electrical energy from the portable electricity generator to the delivery pump.

Moreover, according to an embodiment of the present invention, the method further includes providing electrical energy to the delivery pump from the inverter.

Additionally, according to an embodiment of the present invention, the method further includes connecting at least one of a cable reel and electrical cable to enable the provision of the continuous current.

Moreover, according to an embodiment of the present invention, the method further includes opening at least one manual taps to deliver the water from the UV filter or bypass the UV filter by adjusting the taps accordingly.

Additionally, according to an embodiment of the present invention, the water is filtered, purified potable water.

Further, according to an embodiment of the present invention, a rural user plugs in a delivery nozzle in fluid connection to the delivery conduit to a tank or receptacle.

Yet further, according to an embodiment of the present invention, the rural user activates the delivery pump to provide the filtered, purified potable water to the household.

Importantly, according to an embodiment of the present invention, the method includes mobilization of the apparatus for provision of potable water to populations housed in rural settings.

Additionally, according to an embodiment of the present invention, the method further includes connecting the filling apparatus and filling the water container with water from a reservoir.

Furthermore, according to an embodiment of the present invention, the method further includes filtering the water before filling the water container.

Additionally, according to an embodiment of the present invention, the at least one household includes a plurality of households.

Moreover, according to an embodiment of the present invention, A the hundreds of liters of the water include thousands of liters of the water.

Additionally, according to an embodiment of the present invention, he solar panel charges the battery pack.

Further, according to an embodiment of the present invention, the private car or vehicle tows the trailer carrier.

Additionally, according to an embodiment of the present invention, the private car or the private vehicle tows the trailer carrier using a standard tow hook.

Importantly, according to an embodiment of the present invention the method is a plug and play method.

Additionally, according to an embodiment of the present invention, the water is passed through the micronic and carbon filter system and the UV purifier in the water delivery conduit.

In other embodiments of the present invention, a transportable system is provided for locally providing hundreds of liters of water to a household, the system comprising:
 a) a trailer carrier, adapted to be connected (typically by a hook connector or standard tow hook) to a private car or vehicle;
 b) a water container in fluid connection with a filling apparatus and with a delivery apparatus;
 c) the filling apparatus comprising a filling conduit with a graded pick-up strainer and a filling pump;
 d) a water filter apparatus comprising a micronic and carbon filter system, coupled to an ultraviolet (UV) delivery purifier;
 e) the delivery apparatus comprising a delivery conduit and a delivery pump;
 f) a portable electricity generator, an un-interruptible power supply (UPS) and an inverter;
 wherein the trailer carrier is adapted to carry the water container and water therein, the filling apparatus, the water filter apparatus, the delivery apparatus, the portable electricity generator and the inverter.

The trailer system of the present invention is adapted to provide water whether local electricity and water supplies are available or not. Moreover, the trailer systems of the present invention are configured to provide sufficient potable water where none of electricity supplies, roads and potable water infrastructures is present.

There is thus provided according to an embodiment of the present invention, a transportable modular water provision system for locally providing hundreds of liters of water to at least one household, the system including;
 a) a trailer carrier, adapted to be connected to a private car or vehicle;
 b) a filling apparatus including a filling conduit and a filling pump;
 c) a water filter apparatus comprising a micronic and carbon filter system, coupled to an ultraviolet (UV) delivery purifier;
 d) a delivery apparatus including a delivery conduit and a delivery pump;
 e) a water container in fluid connection with said filling apparatus and with said delivery apparatus;
 f) a portable electricity generator, an un-interruptible power supply (UPS) and an inverter;
 wherein said trailer carrier is adapted to carry said water container and water therein, said filling apparatus, said water filter apparatus, said delivery apparatus, said portable electricity generator and said optional inverter.

Additionally, according to an embodiment of the present invention, the trailer carrier, further includes;
 i. at least one side jack;
 ii. at least two double-wheeled axes; and
 iii. at least one front jack.

Moreover, according to an embodiment of the present invention, the filling apparatus is in fluid connection with the water filter apparatus and wherein the filling pump is adapted to transfer water from a water reservoir via the delivery conduit through the water filter apparatus to the water container.

Additionally, according to an embodiment of the present invention, the water container is a generally cylindrical tank.

Furthermore, according to an embodiment of the present invention, the generally cylindrical tank is made of fiberglass.

Further, according to an embodiment of the present invention, the tank further includes a breather and an inspection window.

Additionally, according to an embodiment of the present invention, the tank further includes manual taps in fluid connection therewith.

Furthermore, according to an embodiment of the present invention, the system is adapted to provide filtered water to the at least one household via the filling apparatus.

Further, according to an embodiment of the present invention, at least one of the filling pump and the delivery pump receive electrical energy from the portable electricity generator.

Further, according to an embodiment of the present invention, at least one of the filling pump and the delivery pump receive electrical energy from the UPS.

Additionally, according to an embodiment of the present invention, at least one of the filling pump and the delivery pump receive electrical energy from the inverter, the inverter receiving electrical energy from the portable electricity generator.

Moreover, according to an embodiment of the present invention, the transportable modular water provision system further includes a cable reel and electrical cable. According to some embodiments, the cable is for an external electrical connection from an external source of electricity.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified pictorial illustration showing a modular system for water provision, in accordance with an embodiment of the present invention;

FIG. 2 is another simplified pictorial illustration showing a modular system for water provision, in accordance with an embodiment of the present invention;

FIG. 3 is a simplified flow chart of a power provision apparatus within the modular system of FIG. 1, in accordance with an embodiment of the present invention;

FIG. 4 is another simplified pictorial illustration showing a modular system for water provision, in accordance with an embodiment of the present invention;

FIG. 5 is a simplified schematic illustration of a control panel of a modular system for water provision, in accordance with an embodiment of the present invention;

FIG. 6 is a simplified flow chart of a method for filling a water reservoir tank, in accordance with an embodiment of the present invention;

FIG. 7 is a simplified flow chart of a method for filling a water reservoir tank from an external hose, in accordance with an embodiment of the present invention;

FIG. 8 is a simplified flow chart of a method for delivering water to a residence, in accordance with an embodiment of the present invention;

FIG. 9 is a simplified flow chart of power provision of a power provision apparatus under tow and disconnected, in accordance with an embodiment of the present invention;

FIG. 10 is a simplified flow chart of power provision of a power provision apparatus connected to an external source filling tank, in accordance with an embodiment of the present invention;

FIG. 11 is a simplified flow chart of power provision of a power provision apparatus connected to an external source when delivering water, in accordance with an embodiment of the present invention;

Figure 12:
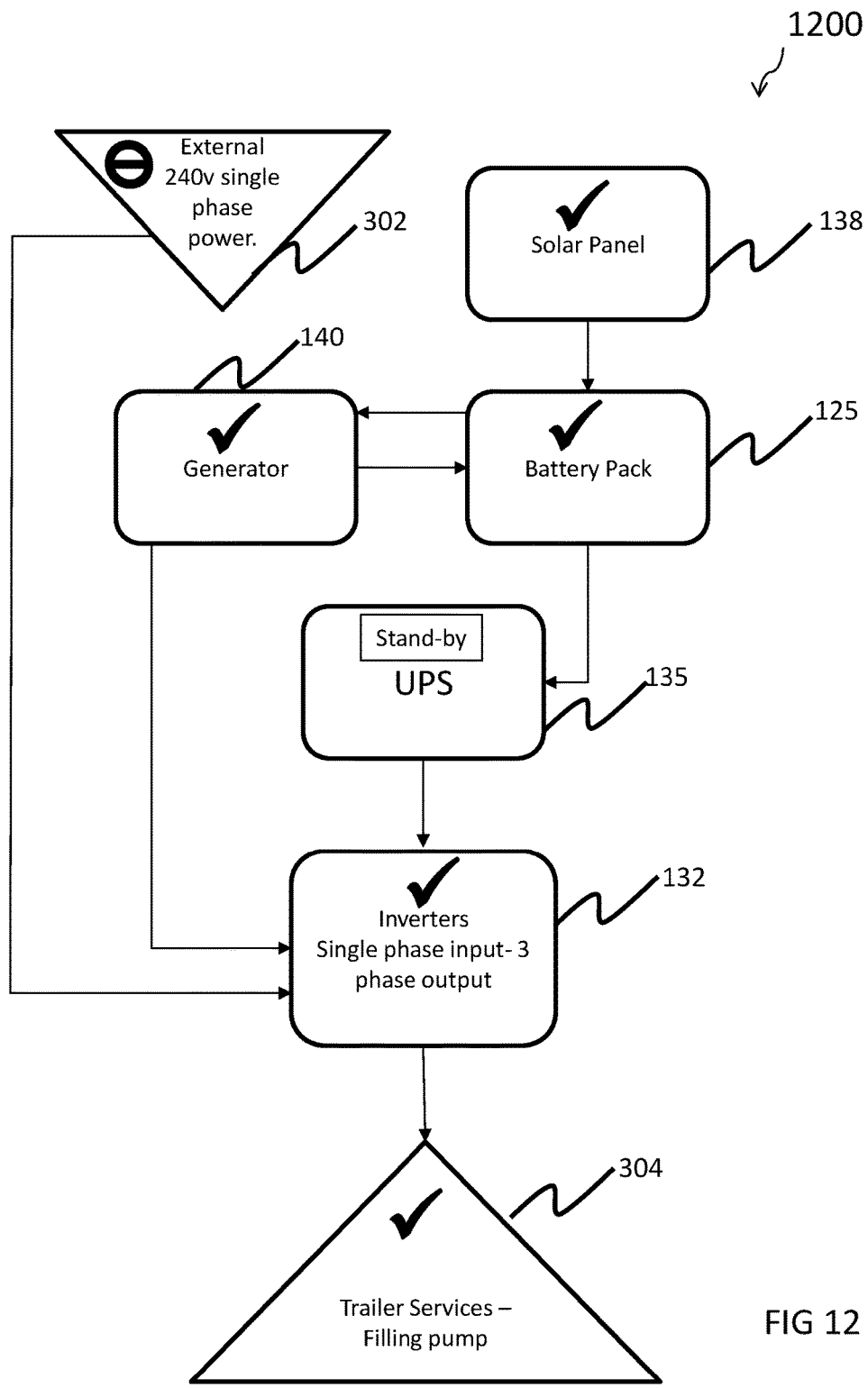
Figure 13:
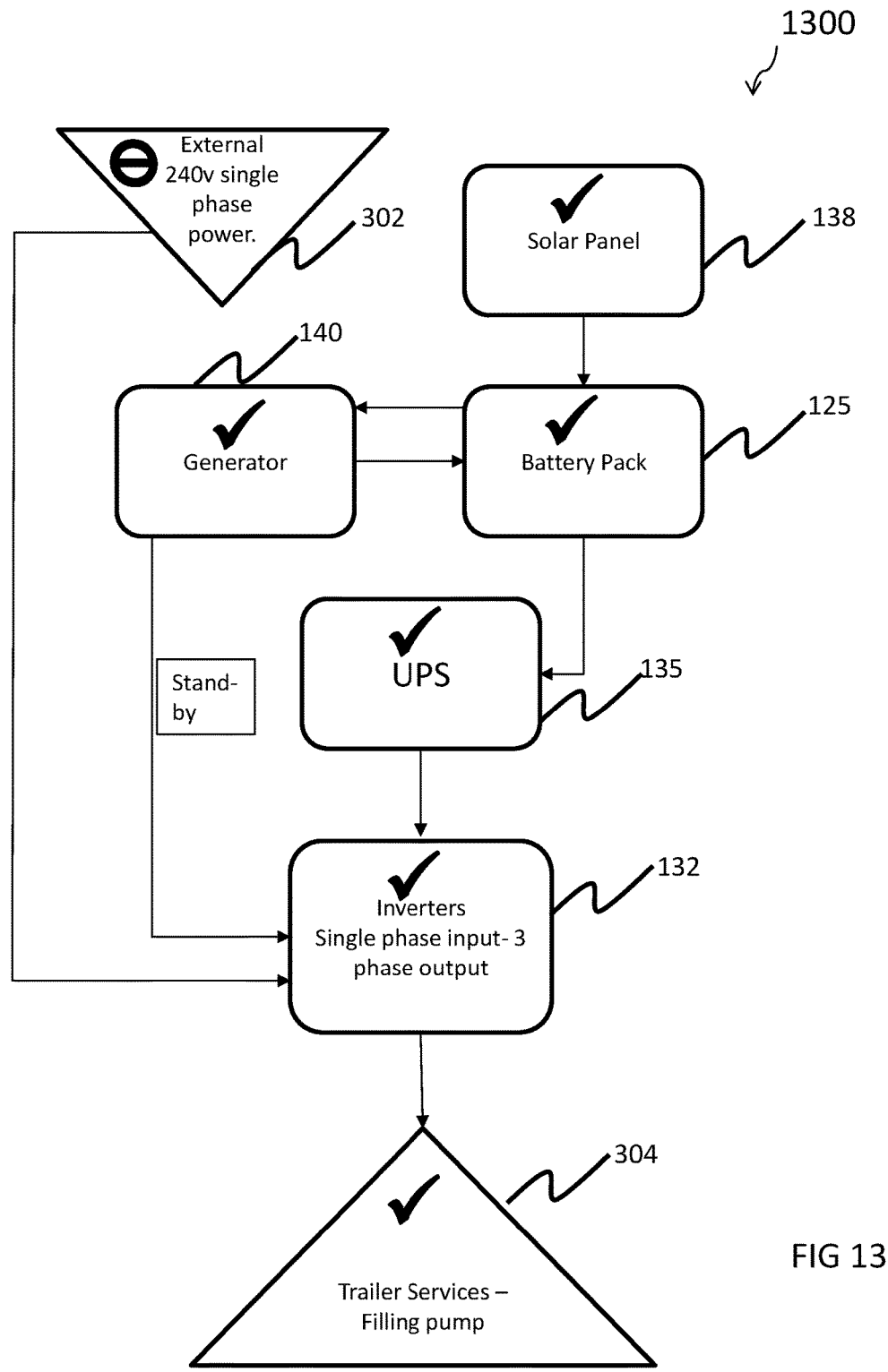
Figure 14:
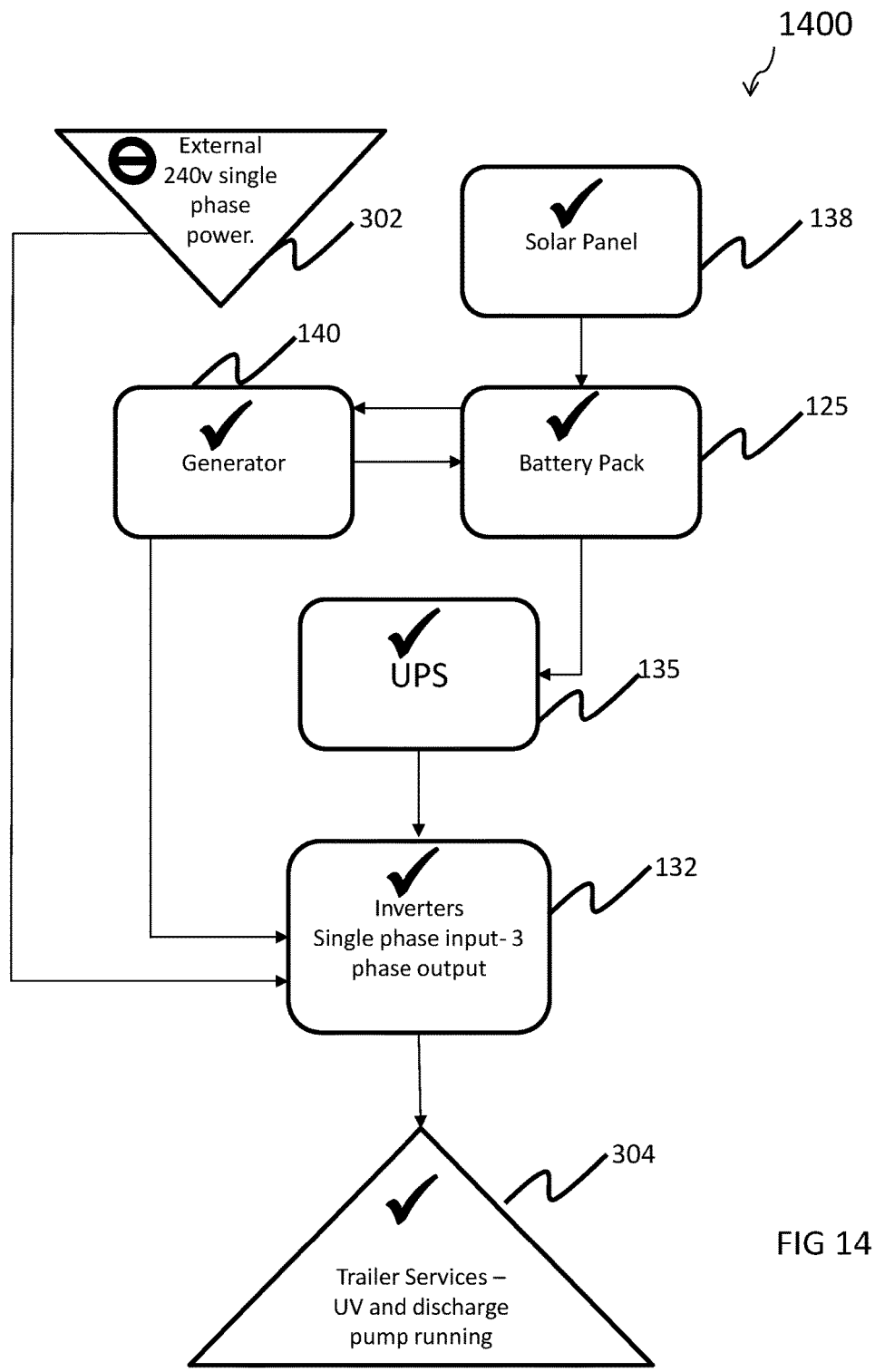
Figure 15:
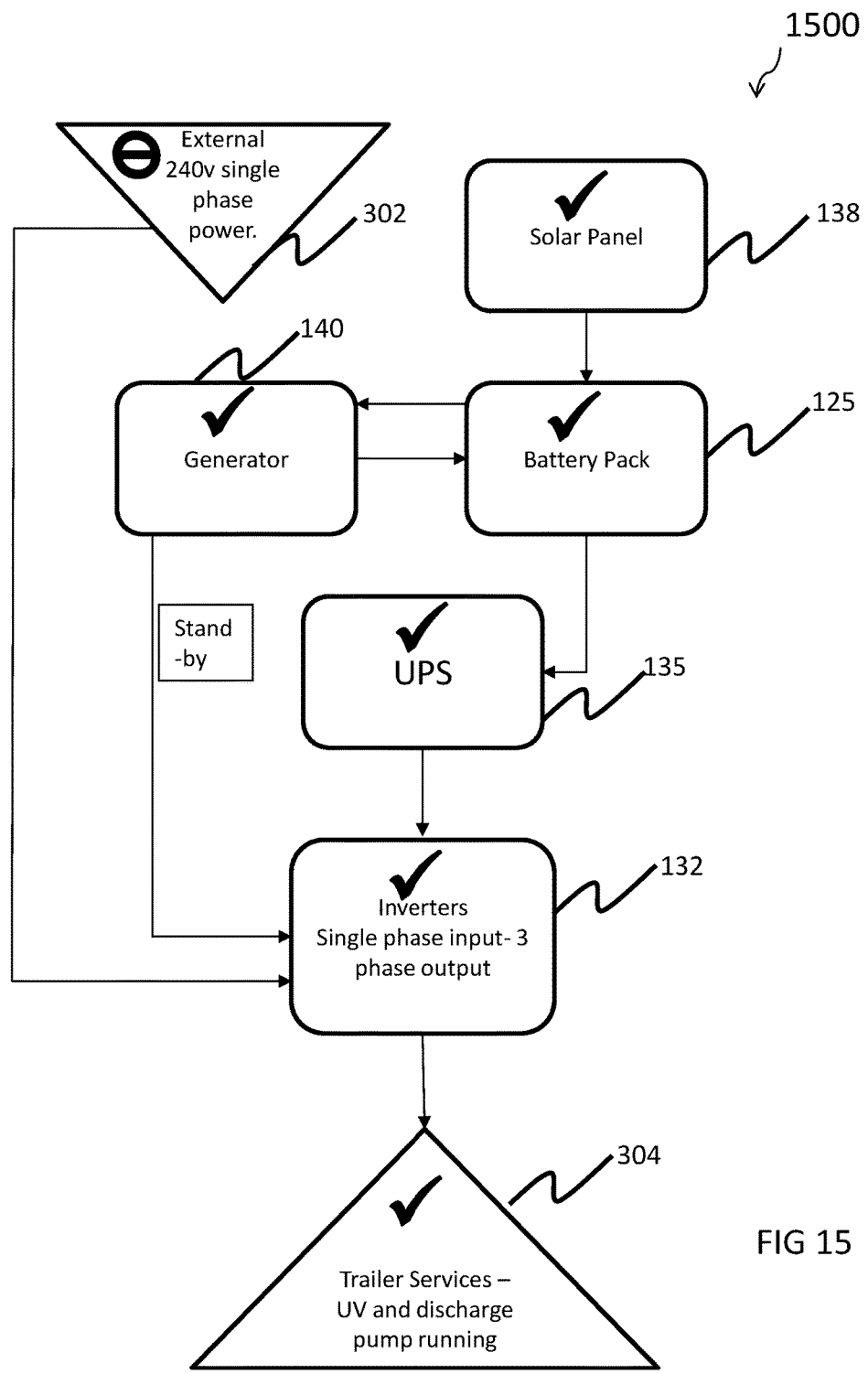
Figure 16:
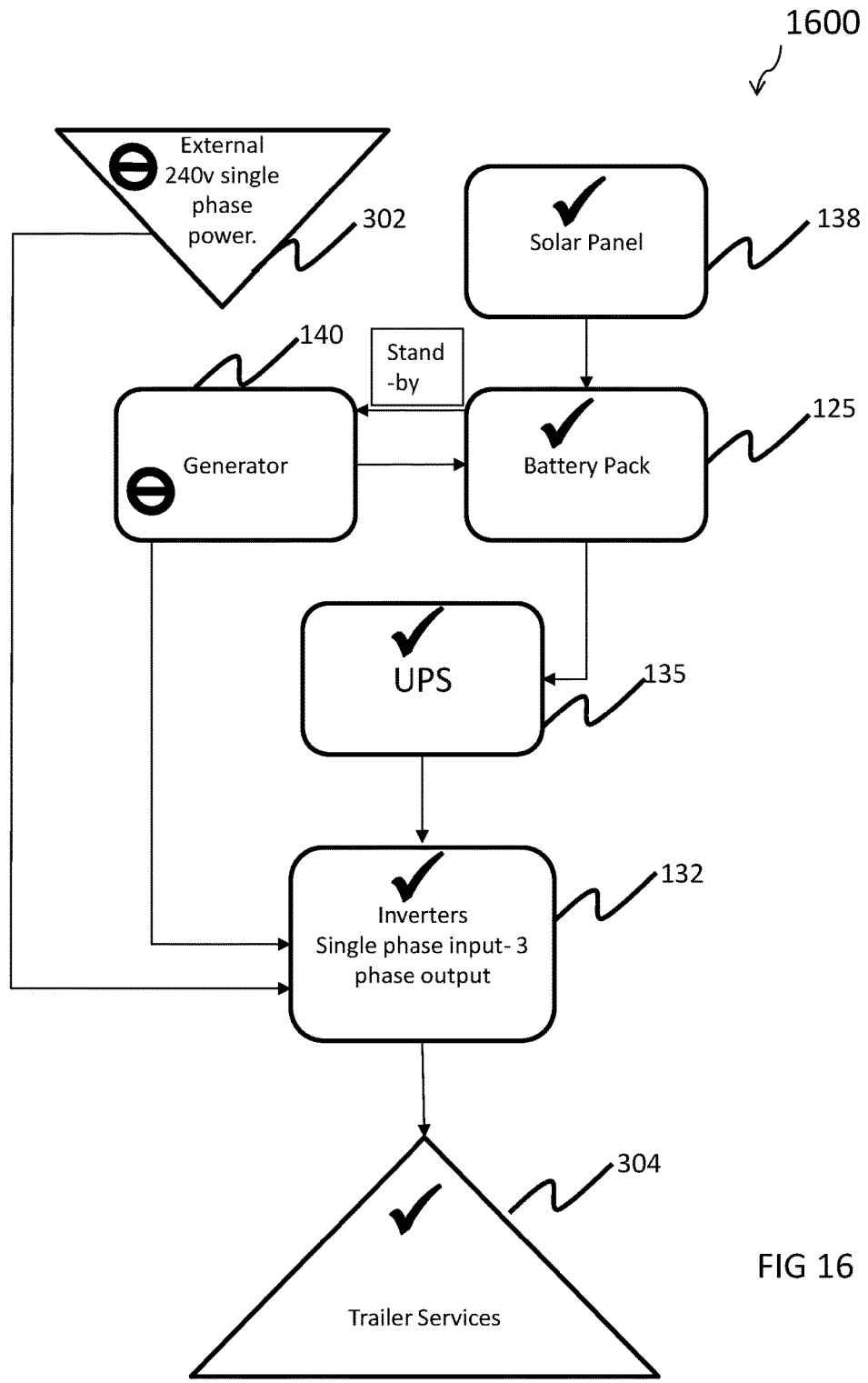

FIG. 12 is a simplified flow chart of power provision of a power provision apparatus without an external power source under low battery state, when filling the reservoir tank, in accordance with an embodiment of the present invention;

FIG. 13 is a simplified flow chart of power provision of a power provision apparatus without an external power source under high battery state, when filling the reservoir tank, in accordance with an embodiment of the present invention;

FIG. 14 is a simplified flow chart of power provision of a power provision apparatus without an external power source under low battery state, when delivering water, in accordance with an embodiment of the present invention;

FIG. 15 is a simplified flow chart of power provision of a power provision apparatus without an external power source under high battery state, when delivering water, in accordance with an embodiment of the present invention; and FIG. 16 is a simplified flow chart of power provision of a power provision apparatus without an external power source and no generator power, when trailer services are provided, in accordance with an embodiment of the present invention;

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

Figure 1:
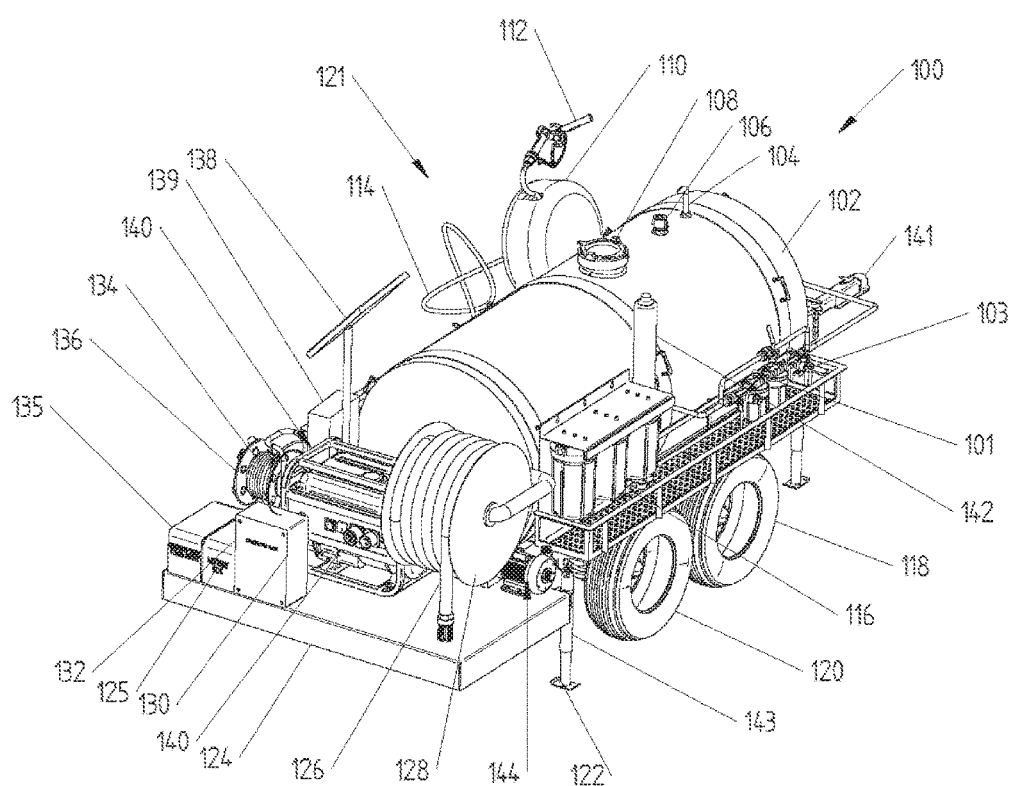

Reference is now made to FIG. 1, which is a simplified pictorial illustration showing a modular system 100 for water provision, in accordance with an embodiment of the present invention.

The system for water provision acts as a transportable system, adapted to provide hundreds to thousands of liters of water to a household or to many households, the system comprising:
 a) a trailer carrier 101, adapted to be connected (typically by a hook connector) to a private car or vehicle (not shown);
 b) a water container (also called a tank) 102 in fluid connection with a filling apparatus (220 FIG. 2) and with a delivery apparatus 121;
 c) the filling apparatus comprising a filling conduit 126 and a filing pump 122;
 d) an input water filter apparatus 116;
 e) the delivery apparatus comprising a delivery conduit 110 and a delivery pump 206 (FIG. 2);
 f) a portable electricity generator 130 and an inverter 132; according to some embodiments the batteries are constructed and configured to be charged by solar electricity;
 g) a solar panel 138 for battery charging (batteries 125, FIG. 3) and a solar panel control unit 139 and a generator set 140;
 h) a universal towing attachment 141 to enable towing of the system by any vehicle or car;
 i) an outlet water filter 103 and an ultraviolet online (UV) purifier 142;
 j) a stabilizing jack 143, at four points on the chassis (carrier 101);
 k) a self-priming pump 144 for filling the tank;
 l) an uninterruptable power supply (UPS) 135,
 wherein the trailer carrier is adapted to carry the water container and water therein, the filling apparatus, the water filter apparatus, the delivery apparatus, the portable electricity generator and the inverter.

Inverter 132 is constructed and configured to supply the pumps 144, 206, at all times. According to some embodiments, they have a single phase input and an additional 3 phase output thereby making the use of cheap and readily available industrial pumps possible.

In the event of the generator set 140 being out of action, the UPS 135 provides short term current as the solar charger which will have been constantly charging the batteries (125, FIG. 3) to ensure they are available.

There is a solar charger comprising a solar panel 138 and a generator set 140, on a carrier 101 which continuously charges all the batteries.

When the generator is running it is configured to charge all the batteries.

The particle and microbial filter system (called water filter apparatus 116 herein) are in the water delivery line before the UV purifier 142.

Carrier 101 is intentionally of a narrow width (less than 1.4 m, preferably less than 1.2 m, more preferably less than 1.0 m) so as to enable access to any area and is intended to be pulled by a standard tow hook (such as universal towing attachment 141).

Additionally, according to an embodiment of the present invention, the trailer carrier, further includes;
 i. a jack disposed at each corner 122, 240 (4 jacks); and
 ii. at least two double-wheeled axles 210 (FIG. 2) with wheels 118.

Moreover, according to an embodiment of the present invention, the filling apparatus is in fluid connection with the water filter apparatus and wherein the filling pump is adapted to transfer water from a water reservoir via the delivery conduit through the water filter apparatus to the water container.

Additionally, according to an embodiment of the present invention, the water container is a generally cylindrical tank.

Furthermore, according to an embodiment of the present invention, the generally cylindrical tank is made of fiberglass.

Further, according to an embodiment of the present invention, the tank further includes a breather 104 and an inspection window 108 and a filling entry port 106.

Additionally, according to an embodiment of the present invention, the tank further includes manual taps 245 (FIG. 2) in fluid connection therewith. The manual taps are configured to deliver from the UV filter or bypass the UV filter by adjusting the taps accordingly.

Furthermore, according to an embodiment of the present invention, the system is adapted to provide filtered water to the at least one household via the filling apparatus.

Further, according to an embodiment of the present invention, at least one of the filling pump and the delivery pump receive electrical energy from the portable electricity generator.

Additionally, according to an embodiment of the present invention, at least one of the filling pump and the delivery pump receive electrical energy from the inverter, the inverter receiving electrical energy from the portable electricity generator.

Moreover, according to an embodiment of the present invention, the transportable modular water provision system further includes a cable reel 134 and electrical cable 136, which may be up to ten, twenty, thirty, forty, fifty, sixty, seventy, eighty, ninety, 100, 200, 300 or 400 meters long. According to some embodiments, the cable is for an external electrical connection from an external source of electricity.

Figure 2:
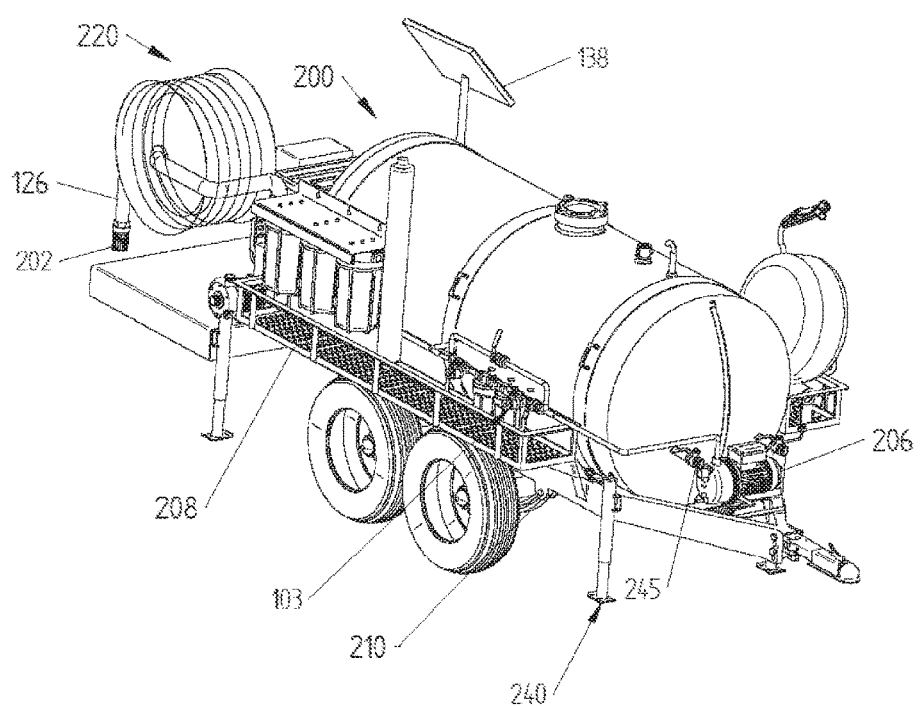

Reference is now made to FIG. 2, which is another simplified pictorial illustration showing another view of a system for water provision 200, in accordance with an embodiment of the present invention. The trailer typically comprises a frame 208 for housing some parts of the system.

The system/apparatus of the present invention is envisaged to be a "plug and play" system, which the rural user, plugs in the delivery nozzle 112 into a tank/receptacle/other filling means and the filtered, purified potable water is provided the system.

Figure 3:
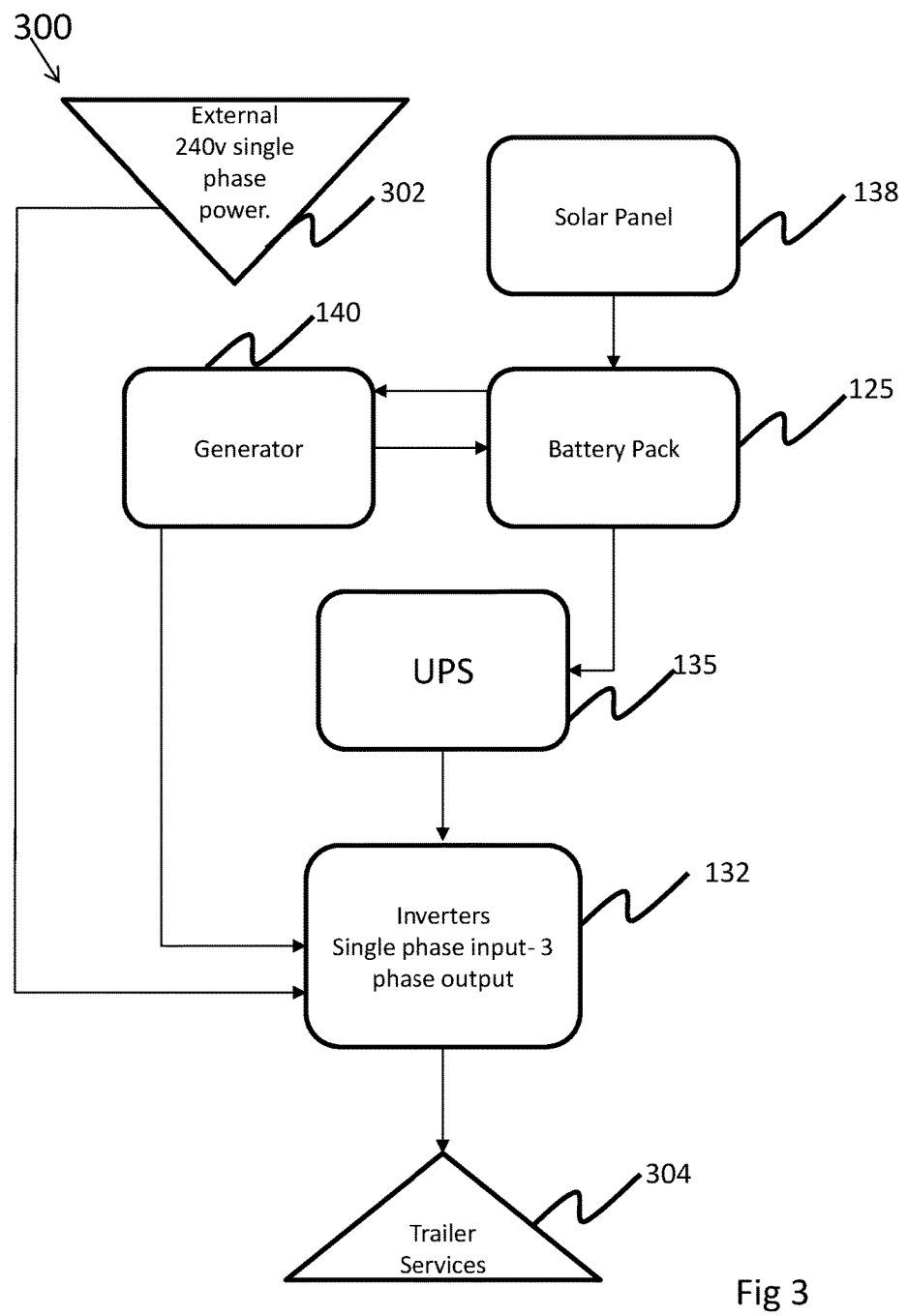

System 100 further comprises a power provision apparatus 300. FIG. 3 shows simplified flow chart of power provision apparatus 300 within the modular system 100 of FIG. 1, in accordance with an embodiment of the present invention.

FIG. 3 shows the main elements of the power system (or also termed herein power provision apparatus 300) which powers the modular system 100.

Power provision apparatus 300 is constructed and configured to power the modular system continuously.

Solar panel 138 is adapted to receive solar energy from the sun and, under some conditions during daylight hours may work continuously until sunset. The generator (generator set 140, FIG. 1) charges the batteries and also supplies power to invertors 132, when in operation. An external power source may be connected and also supplies power to the inverters and when connected, the generator is nonfunctional.

UPS 135 receives power from batteries (battery pack 125), which, in turn, supply the inverters at any time when no generator or external power source are available, enabling the modular system (100, FIG. 1) to be operable at any time and under any conditions.

All output is from the inverters, which supply the output to pumps 144, 206, the UV purification system 142 and/or all trailer services 304.

Figure 4:
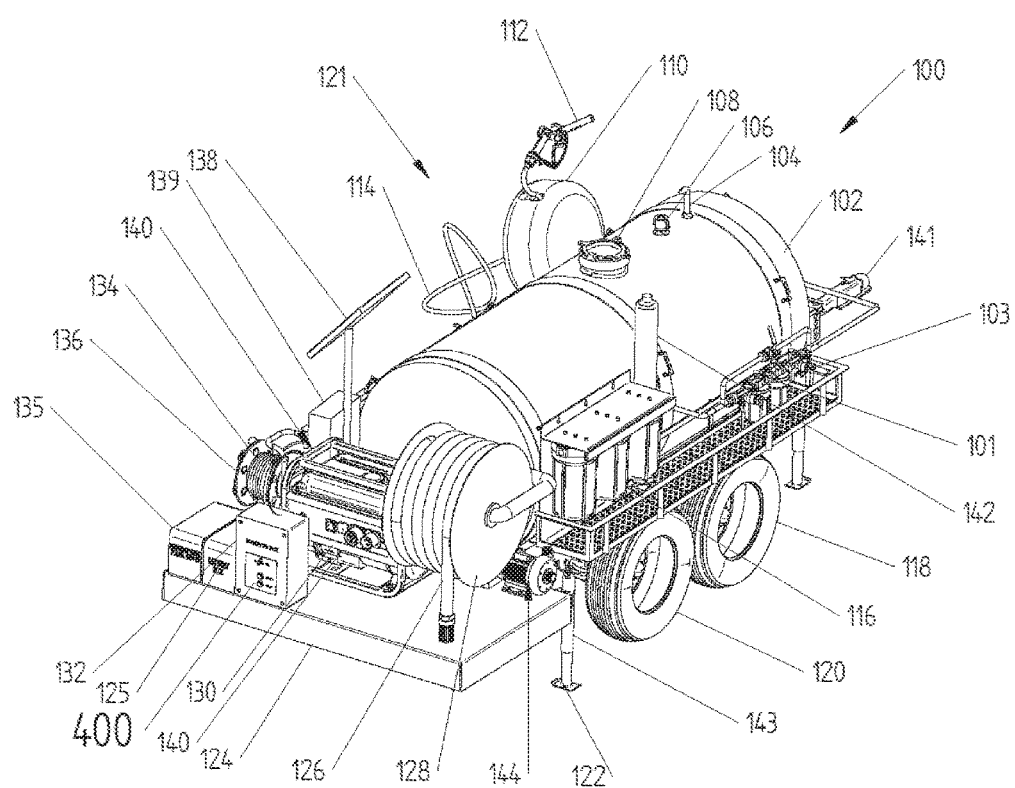

Reference is now made to FIG. 4, which is another simplified pictorial illustration showing a modular system for water provision 100, in accordance with an embodiment of the present invention. The water provision system comprises a control panel 400, shown in further detail in FIG. 5 hereinbelow.

Figure 5:
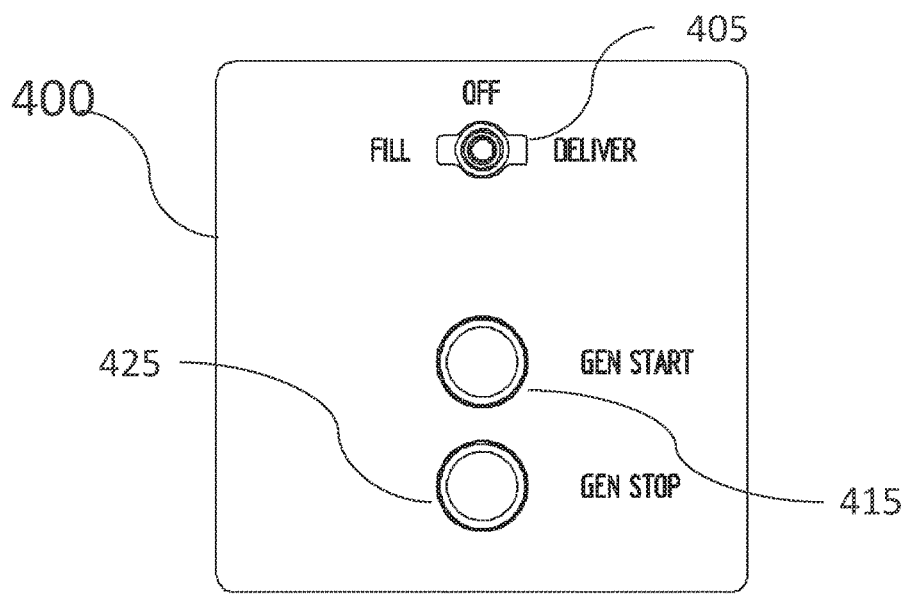

Reference is now made to FIG. 5, which is a simplified schematic illustration of a control panel 400 of a modular system for water provision 100, in accordance with an embodiment of the present invention.

FIG. 5 shows details of the control panel of the modular system. The control panel comprises a two-way switch 405 for filling pump 122, off and delivery pump 206. Turning the two-way switch to the left activates the filling pump and turning it to the right activates the delivery pump. In the central position, both pumps are switched off. The control panel further comprises a generator activator buttons 415 and a generator stop button 425.

Figure 6:
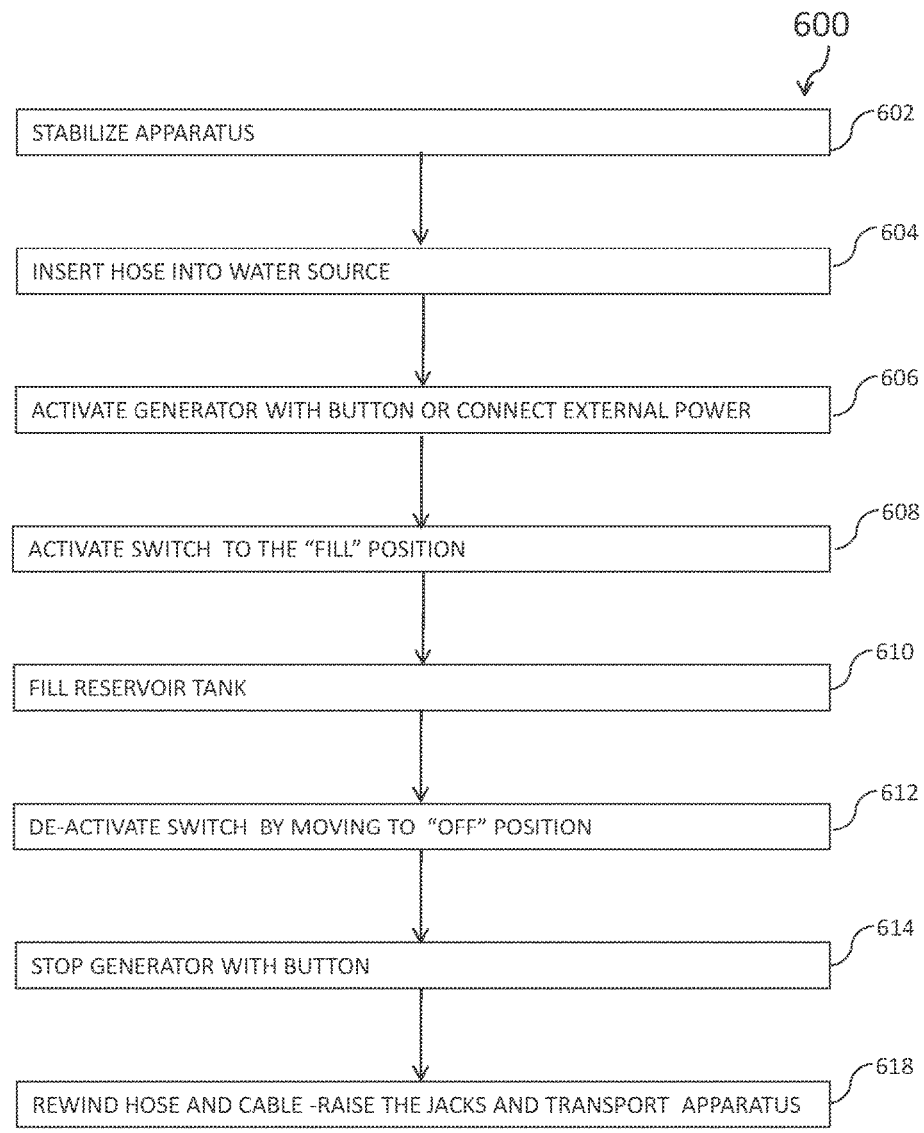

Reference is now made to FIG. 6, which is a simplified flow chart 600 of a method for filling a water reservoir tank (water container 102, FIG. 1), in accordance with an embodiment of the present invention.

In a stabilizing the apparatus (modular system 100) step 602, the trailer carrier jacks are adjusted to stabilize the system.

Thereafter, hose 126 is inserted into a water source, such as a pond or lake, in an inserting hose step 604.

The operator then activates the generator 130 with button 415 (FIG. 5), in an activating generator step 606. If the generator is not operative, due to some technical problem, the operator may optionally connect the modular system with cable 134 to an external power source. If the generator fails to operate for any reason, the pumps will still operate by means of the batteries 125, UPS 135 and inverters 132, as normal.

Thereafter, switch 405 is moved to the fill position, in an activating "fill" switch step 608.

The water container (reservoir tank) 102 is then filled in a filling tank step 610. Once this is completed, switch 405 is turned off in a deactivating switch 405 step 612.

The operator then switches off the generator with button 425, in a switching off generator step 614.

The operator then rewinds hose 126 (and cable 134, if used) raise the jacks 143 and transports the modular system on the trailer with the filled tank in a transporting step 618. The modular system is then at the point of use and ready for use.

Figure 7:
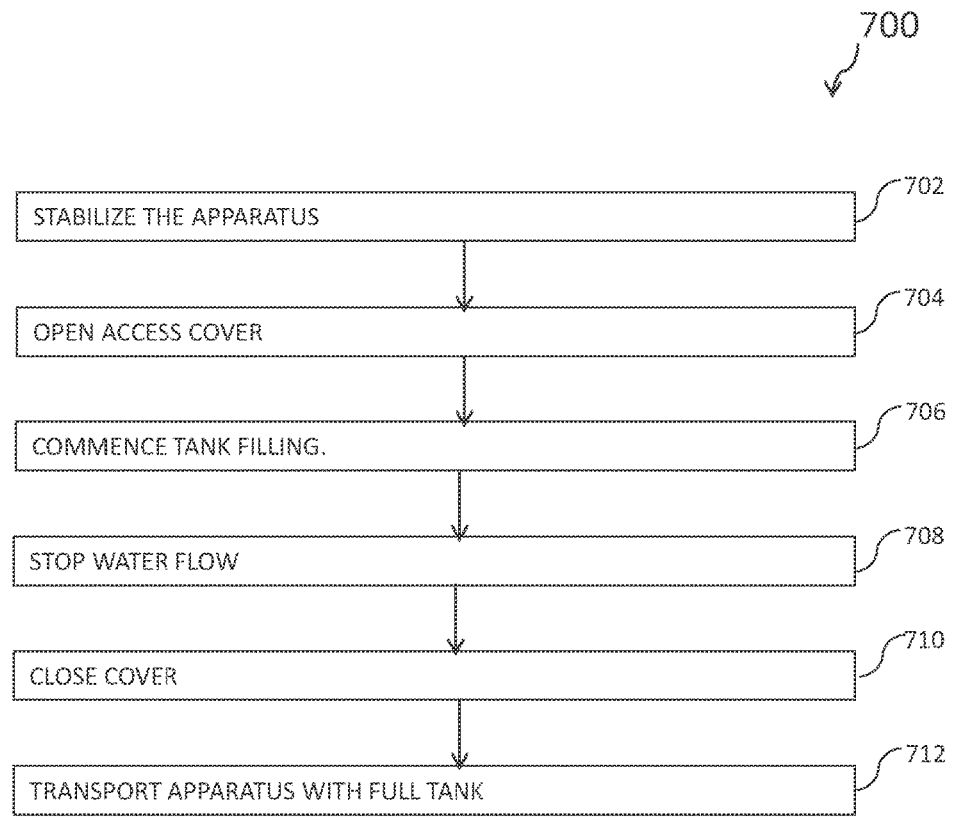

Reference is now made to FIG. 7, which is a simplified flow chart 700 of a method for filling a water reservoir tank from an external hose, in accordance with an embodiment of the present invention.

In a stabilizing the apparatus (modular system 100) step 702, the trailer carrier jacks are adjusted to stabilize the system.

In an opening access cover step 704, the access cover (also termed herein, filling entry port 106, FIG. 1) is opened.

In a tank filling step 706, the water source connector or hose (not shown) is connected to the filling entry port and water enters tank 102. When the tank is sufficiently full, the operator stops the water flow in a stopping water flow step 708.

The filling entry port 106 is then closed in a closing cover step 710.

The operator then raises the jacks 143 and transports the modular system on the trailer with the filled tank in a transporting step 712. The modular system is then at the point of use and ready for use.

Figure 8:
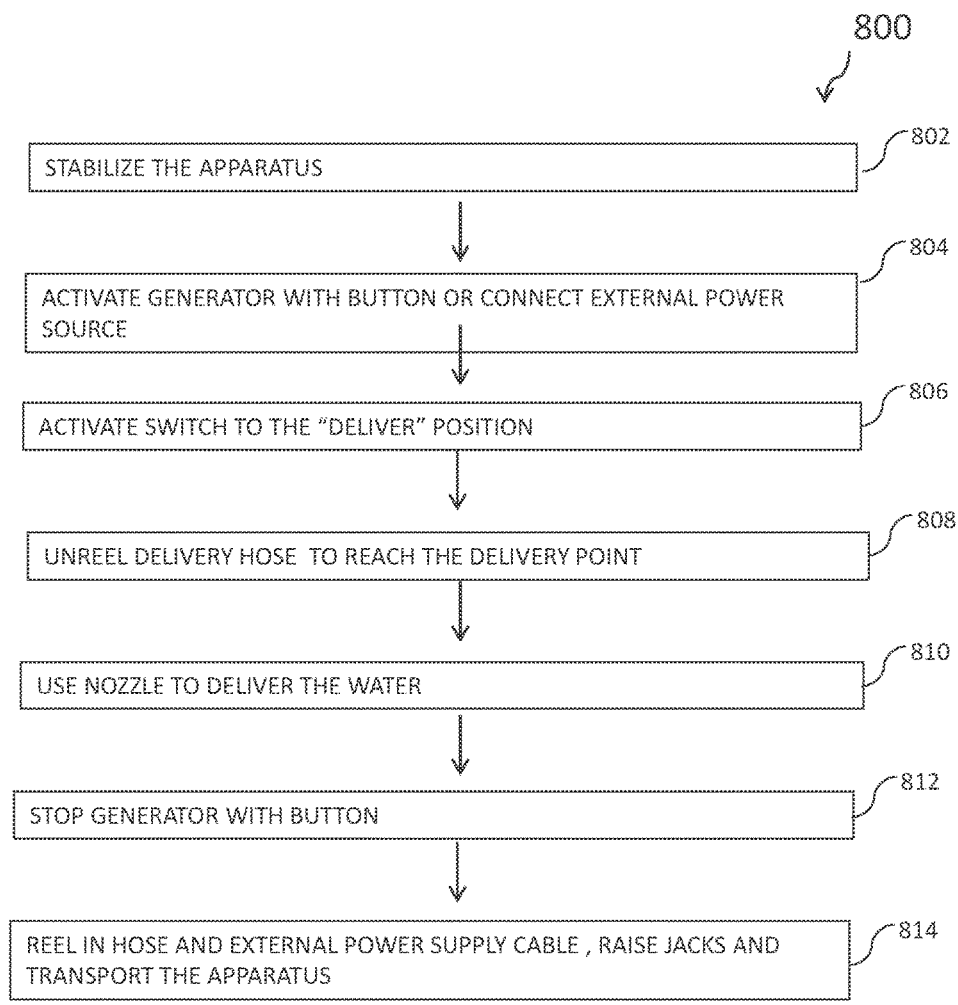

Reference is now made to FIG. 8, which is a simplified flow chart 800 of a method for delivering water to a residence, in accordance with an embodiment of the present invention.

In a stabilizing the apparatus (modular system 100) step 802, the trailer carrier jacks are adjusted to stabilize the system.

The operator then activates the generator 130 with button 415 (FIG. 5), in an activating generator step 804. If the generator is not operative, due to some technical problem, the operator may optionally connect the modular system with cable 134 to an external power source. If the generator fails to operate for any reason, the pumps will still operate by means of the batteries 125, UPS 135 and inverters 132, as normal.

Thereafter, switch 405 is moved to the deliver position, in an activating "deliver" switch step 806.

The operator then unreels delivery hose 121, to reach the delivery point, such as a water tank of a tent, caravan, domicile, house or other point in need of water delivery, in a connecting delivery hose step 808.

The operator plugs in delivery nozzle 112 into a tank/receptacle/other filling means and the filtered, purified potable water is provided from system 100 to the local tank, in a water delivery step 810.

The operator then switches off the generator with button 425, in a switching off generator step 812.

The operator then rewinds hose 126 (and cable 134, if used) raise the jacks 143 and transports the modular system on the trailer with the filled tank in a transporting step 814. The modular system is then at the point of refill/reuse and ready for refilling and/or reuse.

Figure 9:
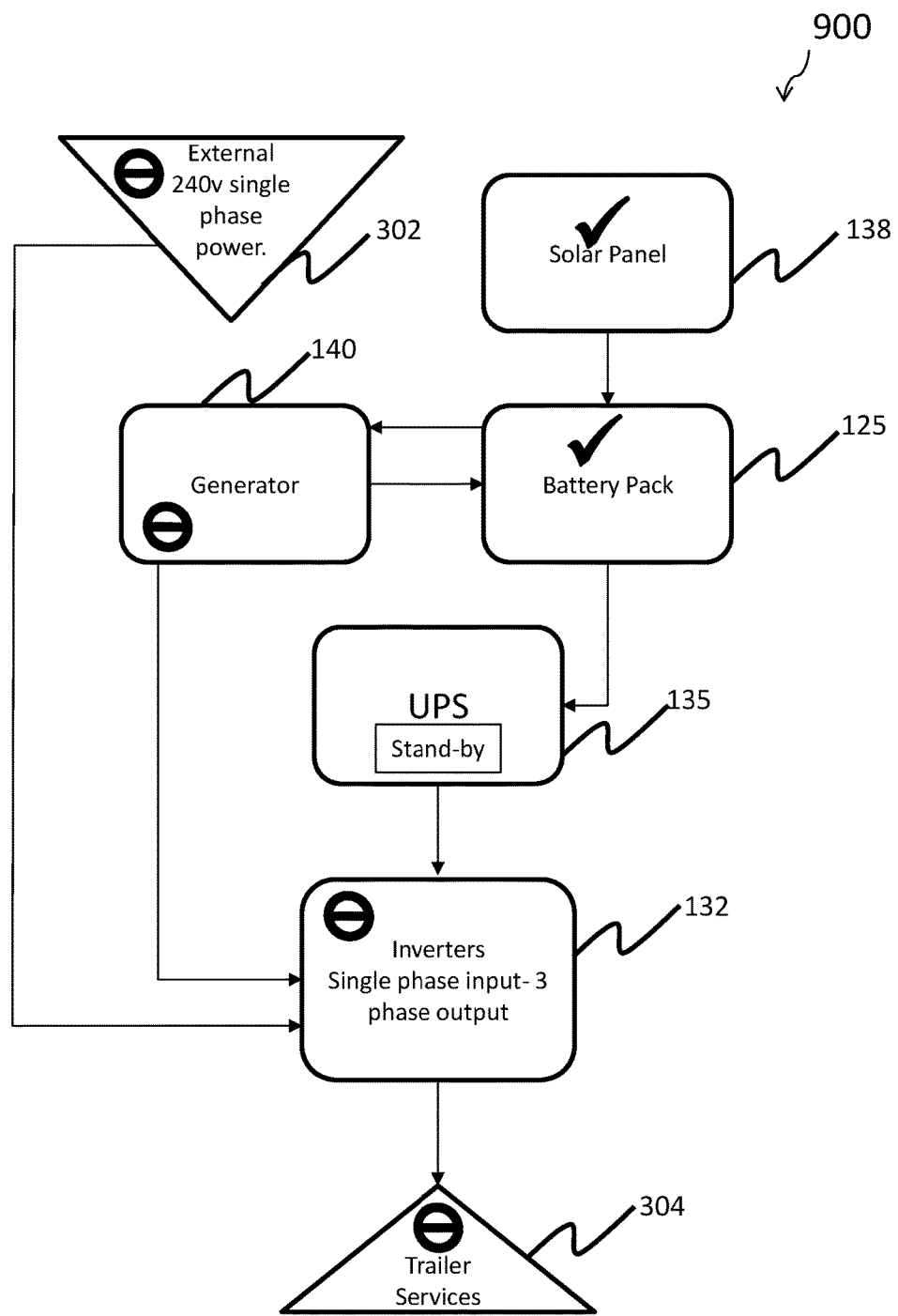

Reference is now made to FIG. 9, which is a simplified flow chart 900 of power provision of a power provision apparatus under tow and disconnected, in accordance with an embodiment of the present invention.

FIG. 9 shows the control condition state with the modular system is being transported. The solar panel is live charging the battery pack as shown by the tick marks and the UPS is self-governing and on standby mode as there is no demand on it. The rest of the elements are down (off) as show by the stop signs.

Figure 10:
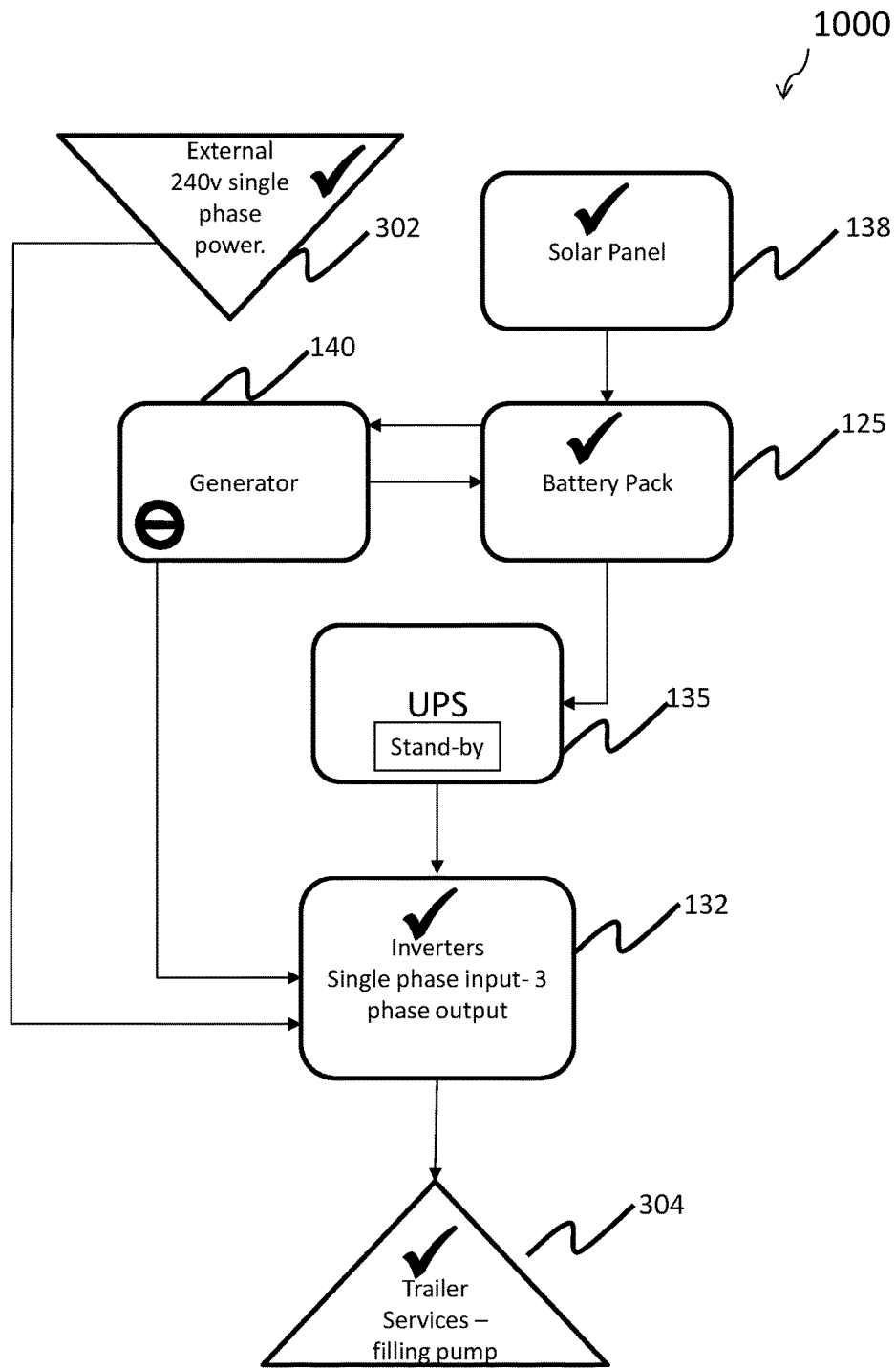

Reference is now made to FIG. 10, which is a simplified flow chart 1000 of power provision of a power provision apparatus connected to an external source filling tank, in accordance with an embodiment of the present invention.

FIG. 10 shows the control condition state for filling the modular system tank 102 from an external source by pump. The solar panel charges the battery pack, and are both live, as shown by the ticks and the UPS is in standby mode. The generator is automatically off as shown by the stop mark and the external power powers the inverters directly, which, in turn, power the trailer services.

Figure 11:
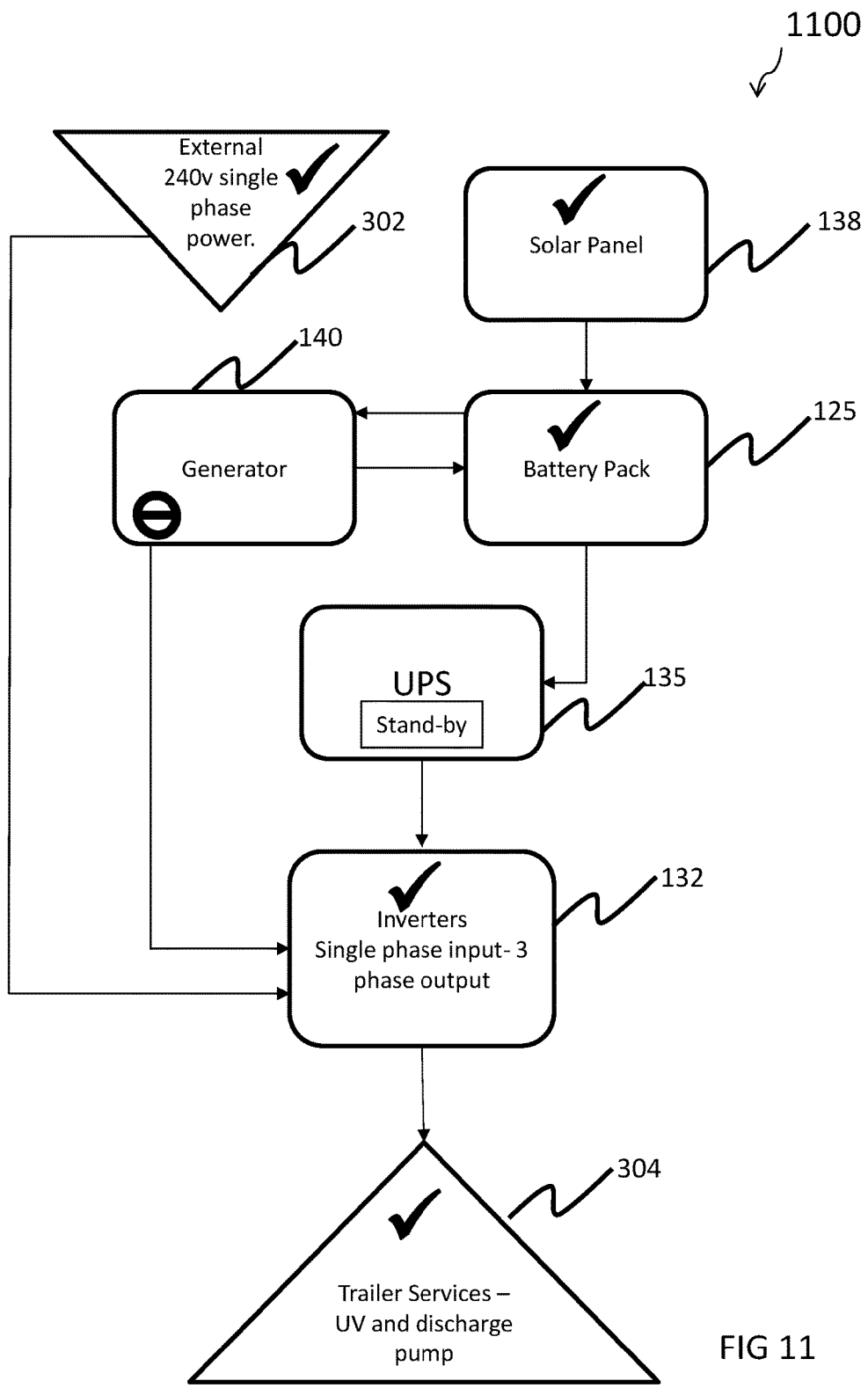

Reference is now made to FIG. 11, which is a simplified flow chart 1100 of power provision of a power provision apparatus connected to an external source when delivering water, in accordance with an embodiment of the present invention.

FIG. 11 shows the control condition state for delivery of water from the modular system, when connected to an external power source. The solar panel charges the battery pack and both are live as shown by the ticks and the UPS is in standby mode. The generator is automatically off as shown by the stop mark and the external power powers the inverters directly, which, in turn, power the trailer services.

Reference is now made to FIG. 12, which is a simplified flow chart 1200 of power provision of a power provision apparatus without an external power source under low battery state, when filling the reservoir tank, in accordance with an embodiment of the present invention.

FIG. 12 shows the control condition state, while filling, with the generator operating and the batteries in need of being charged. In this state, there is no external power, as shown by the "off" sign and the solar panel charges the batteries, marked by ticks, as well as the generator. However, the UPS is in standby mode and power from the generator powers the inverters, which are in use, marked by a tick, but do not receive power from the UPS in this situation. The trailer services are working and operative.

Reference is now made to FIG. 13, which is a simplified flow chart 1300 of power provision of a power provision apparatus without an external power source under high battery state, when filling the reservoir tank, in accordance with an embodiment of the present invention.

FIG. 13 shows the control condition state while filling by pump with no external power connected, marked by an off sign, and the generator running and the solar panel always charging the batteries, both marked with a tick. The UPS is working, marked with a tick and is also supplying the inverters, which are, in turn, supplying the trailer services marked as "on" with ticks, respectively.

FIG. 14 is a simplified flow chart 1400 of power provision of a power provision apparatus without an external power source under low battery state, when delivering water, in accordance with an embodiment of the present invention.

FIG. 14 shows the control condition state while delivering water with a low battery state and the generator operating. In this condition, there is no external power source and generator supplies charge to the batteries and to the inverters, while the UPS automatically senses battery state and will come on line automatically.

FIG. 15 is a simplified flow chart 1500 of power provision of a power provision apparatus without an external power source under high battery state, when delivering water, in accordance with an embodiment of the present invention.

FIG. 15 shows the control condition where the batteries are at full charge during delivery. All the control elements are shown as working and there is no external power source attached. At such time as the batteries are at, or beyond, full charge, the UPS is operational and the generator goes over to the stand-by mode. In this way, battery life is promoted by creating a cycle sequence for the batteries and conserving generator fuel.

FIG. 16 is a simplified flow chart 1600 of power provision of a power provision apparatus without an external power source and no generator power, when trailer services are provided, in accordance with an embodiment of the present invention.

FIG. 16 shows the control condition where there is no external power or generator available, which are marked as "off". The rest of the elements are on line. In this case, the battery is on standby to supply the starting power for the generator and is being charged by the solar panels. The battery pack supplies the UPS and the UPS supplies the inverters, which supply the trailer services.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A method for local delivery of hundreds of liters of water to at least one household, the method comprising:
   a) transporting a trailer carrier by a private car or vehicle to the at least one household where road infrastructure is lacking, said trailer carrier being less than 1.4 meters wide, said trailer carrier housing:
      i. a filling apparatus comprising a filling conduit and a filling pump;
      ii. a water filter apparatus comprising a micronic and carbon filter system, coupled to an ultraviolet (UV) delivery purifier;
      iii. a delivery apparatus comprising a delivery conduit and a delivery pump;
      iv. a water container in fluid connection with said filling apparatus and with said delivery apparatus;
      v. a portable electricity generator, an un-interruptible power supply (UPS) and an inverter;
      vi. a battery pack; and
      vii. a solar panel;
   b) providing continuous current to said inverter for continuous function of said filling pump and said delivery pump; and
   c) delivering the hundreds of liters of water from the water container on the trailer carrier to the household.

2. A method according to claim 1, wherein said delivering step comprises:
   i. fluidly connecting the water filter apparatus to said water container;
   ii. fluidly connecting said delivery conduit to said water container; and
   iii. electrically activating said delivery pump.

3. A method according to claim 2, wherein said delivering step provides filtered water to said at least one household via said delivery apparatus.

4. A method according to claim 2, wherein said electrically activating step comprises providing electrical energy from said portable electricity generator to said delivery pump.

5. A method according to claim 4, further comprising providing electrical energy to said delivery pump from said inverter.

6. A method according to claim 1, further comprising opening at least one manual tap to deliver said water from the UV filter or bypass the UV filter by adjusting the taps accordingly.

7. A method according to claim 1, wherein said water is filtered, purified potable water.

8. A method according to claim 7, wherein a rural user plugs in a delivery nozzle in fluid connection to said delivery conduit to a tank or receptacle.

9. A method according to claim 8, wherein said rural user activates said delivery pump to provide said filtered, purified potable water to said household.

10. A method according to claim 1, wherein said method comprises mobilization of said apparatus for provision of potable water to populations housed in rural settings.

11. A method according to claim 1, wherein said method further comprises connecting said filling apparatus and filling said water container with water from a reservoir.

12. A method according to claim 11, further comprising filtering said water before filling said water container.

13. A method according to claim 1, wherein at least one household comprises a plurality of households.

14. A method according to claim 1, wherein said hundreds of liters of said water comprise thousands of liters of said water.

15. A method according to claim 1, wherein said solar panel charges said battery pack.

16. A method according to claim 1, wherein said private car or vehicle tows said trailer carrier.

17. A method according to claim 16, wherein said private car or said private vehicle tows said trailer carrier using a standard tow hook.

18. A method according to claim 2, wherein the water is passed through the micronic and carbon filter system and the UV purifier in the water delivery conduit.

* * * * *